(12) United States Patent
Vanhala et al.

(10) Patent No.: US 9,478,966 B2
(45) Date of Patent: Oct. 25, 2016

(54) ELECTRIC NETWORK PROTECTION

(71) Applicant: ABB Technology AG, Zurich (CH)

(72) Inventors: Kari Vanhala, Vähäkyrö (FI); Petri Koivula, Laihia (FI)

(73) Assignee: ABB Schweiz AG, Baden (CH)

( * ) Notice: Subject to any disclaimer, the term of this patent is extended or adjusted under 35 U.S.C. 154(b) by 494 days.

(21) Appl. No.: 14/136,926

(22) Filed: Dec. 20, 2013

(65) Prior Publication Data
US 2014/0104735 A1    Apr. 17, 2014

Related U.S. Application Data

(63) Continuation of application No. PCT/EP2012/061801, filed on Jun. 20, 2012.

(30) Foreign Application Priority Data

Jun. 23, 2011 (EP) ..................... 11171147

(51) Int. Cl.
*H02H 7/09* (2006.01)
*G01R 31/42* (2006.01)
*H02H 1/00* (2006.01)
(Continued)

(52) U.S. Cl.
CPC .............. *H02H 1/0007* (2013.01); *H02J 3/40* (2013.01); *H02J 2003/388* (2013.01)

(58) Field of Classification Search
CPC ........ H02H 7/09; H02H 3/006; G01R 31/42; G01R 29/16
USPC .......................................................... 361/85
See application file for complete search history.

(56) References Cited

U.S. PATENT DOCUMENTS

| 2008/0204044 A1* | 8/2008 | Ponnaluri | ................ H02J 3/38 |
| | | | 324/647 |
| 2011/0063768 A1 | 3/2011 | Sexton et al. | |
| 2012/0271575 A1 | 10/2012 | Tumilty et al. | |

FOREIGN PATENT DOCUMENTS

| CN | 101136549 A | 3/2008 |
| CN | 101268218 A | 9/2008 |
| CN | 101521407 A | 9/2009 |

(Continued)

OTHER PUBLICATIONS

CN-101521407, Entire specification and drawings.*

(Continued)

*Primary Examiner* — Dharti Patel
(74) *Attorney, Agent, or Firm* — Taft Stettinius & Hollister LLP

(57) ABSTRACT

A protection relay is provided for protection of an electric network. The protection relay measures an electric signal in the network, converts the measured signal to a frequency domain representation of the measured signal, and generates a measuring phasor based on the frequency domain representation, where the phase rotation of the measuring phasor is dependent on one or more frequency components present in the measured electric signal. The protection relay compares the measuring phasor to the reference phasor, where the phase rotation of the reference phasor is based on either a nominal or a measured frequency of the electric network, and launches protection if the comparison of the of the measuring phasor and the reference phasor fulfils a predetermined criterion.

21 Claims, 5 Drawing Sheets

(51) Int. Cl.
*H02J 3/40* (2006.01)
*H02J 3/38* (2006.01)

(56) References Cited

FOREIGN PATENT DOCUMENTS

EP          1 764 894 A1    3/2007
WO   WO 2011/038756 A1    4/2011

OTHER PUBLICATIONS

CN-10136549, Entire specification and drawings.*
CN-101268218, Entire specification and drawings.*
Office Action (Notification of the First Office Action) issued on May 22, 2015, by the State Intellectual Property Office of People's Republic of China in corresponding Chinese Patent Application No. 201280030990.2, with an English translation of the Office Action. (21 pages).
Office Action (Second) issued on Dec. 17, 2015, by the State Intellectual Property Office of the Peoples Republic of China in corresponding Chinese Patent Application No. 201280030990.2 (21 pgs).
Sun, Yanan, "Shandong University Masters Thesis", Apr. 20, 2006, pp. 1-62.
International Search Report (PCT/ISA/210) mailed on Aug. 16, 2013, by the European Patent Office as the International Searching Authority for International Application No. PCT/EP2012/061801.
Written Opinion (PCT/ISA/237) mailed on Aug. 16, 2013, by the European Patent Office as the International Searching Authority for International Application No. PCT/EP2012/061801.
European Search Report issued on Jan. 12, 2012.
Adam Dysko et al., "Novel Protection Methods for Active Distribution Networks With High Penetrations of Distributed Generation", DTI Centre for Distributed Generation and Sustainable Electrical Energy, Jun. 1, 1006, pp. 1-40, XP-002598492.

* cited by examiner

Prior art

ELECTRIC NETWORK PROTECTION

RELATED APPLICATIONS

This application claims priority as a continuation application under 35 U.S.C. §120 to PCT/EP2012/061801, which was filed as an International Application on Jun. 20, 2012 designating the U.S., and which claims priority to European Application 11171147.9 filed in Europe on Jun. 23, 2011. The entire contents of these applications are hereby incorporated by reference in their entireties.

FIELD

The present disclosure relates to a method and an arrangement for protection of an electric network, for example in the detection of a loss of mains situation.

BACKGROUND INFORMATION

The Loss of Mains (LOM) protection is often required when distributed generation (DG) is connected to a power system network and the DG generator is not allowed to stay connected to the network if the main supplying network is disconnected. This situation is also called an unwanted islanding operation.

In normal operation, when the distributed generation generator is connected to the power system network, there is a phase difference between an electromagnetic force and terminal voltages of the generator. This is illustrated in FIG. 1, where the power system network/main feeder network is depicted by reference number 100 and the distributed generator system/network is depicted by reference number 102. $E_m$ is the electromagnetic force, $X_d$ is the reactance, and $I_{generator}$ is the current of the distributed generation generator. Z is the load impedance in the network, and $V_m$ is the terminal voltage of the generator. The voltage drop $\Delta V$ between $E_m$ and $V_m$ can be calculated as (1):

$$\Delta V = X_d * I_{generator} \quad (1)$$

The vector representation on the right shows how the voltage drop $\Delta V$ depends on $V_m$ and $E_m$.

FIG. 2 shows a fault situation, where the supplying network 100 is disconnected by opening a circuit breaker at the substation switchgear, for instance, and the DG generator 102 stays connected to the islanded network. As a consequence of an increasing current $I_{generator}$, as shown by the vector representation on the right, the voltage drop gets a new value. When this occurs, the terminal voltage $V_m$ of the DG generator 102 will suddenly shift to a new value.

In a known method, the detection of the change of the terminal voltage $V_m$ has been carried out by measuring time intervals of successive half cycles of the measured sinusoidal voltage signal, which is illustrated by FIG. 3. In that method, the calculation of the half cycle $\pi$ interval starts and ends from/to zero crossing detection. In FIG. 3, there is a fault in the network occurring in the third half-cycle, whereby the zero-crossing of the signal occurs at moment $\pi + \Delta\theta$ instead of the principal moment $\pi$.

Signal harmonics and other measurement interferences can easily cause maloperation to the measurement. Another problem is oscillation in the vicinity of the zero crossing which has, in practice, required a hysteresis handling of the signal. Zero crossing detection can even be prevented by a direct current component present in the signal.

WO 2011/038756 refers to "Novel protection methods for active distribution networks with high penetrations of distributed generation, Year II report authored by A. Dysko, G. Burt and R. Bugdal, June 2006". It presents a frequency domain based "method 1" with locally delayed voltage angle signals. In the method, first harmonics recent and arbitrarily delayed historical fft-phasor angles are subtracted from each other, and if the subtraction exceeds a threshold value, the protection function will be applied. The method presented in WO 2011/038756 has the drawback in that an indication of a fault situation in the network is slow. This leaves less time for reacting to network changes, which may lead to material damages or cause a security hazard, for instance.

There is thus a desire for an improved loss of mains detection in an electric network.

SUMMARY

An exemplary embodiment of the present disclosure provides a protection relay for protection of an electric network. The exemplary protection relay includes means for measuring an electric signal in the network, means for converting the measured signal to a frequency domain representation of the measured signal, and means for rotating a measuring phasor based on the frequency domain representation, where the phase rotation of the measuring phasor is dependent on at least one frequency component present in the measured electric signal. The exemplary protection relay also includes means for generating a rotating reference phasor, where the reference phasor is rotated at one of a nominal frequency and a measured frequency of the electric network. In addition, the exemplary protection relay includes means for comparing the phase rotation of the rotating measuring phasor to the phase rotation of the generated rotating reference phasor, and means for launching protection if the comparison of the measuring phasor and the reference phasor fulfils a predetermined criterion.

An exemplary embodiment of the present disclosure provides a method of protecting an electric network. The exemplary method includes measuring an electric signal in the network, converting the measured signal to a frequency domain representation of the measured signal, and rotating a measuring phasor based on the frequency domain representation, where the phase rotation of the measuring phasor is dependent on at least one frequency component present in the measured electric signal. The exemplary method also includes generating a rotating reference phasor, where the reference phasor is rotated one of at a nominal frequency and a measured frequency of the electric network. In addition, the exemplary method includes comparing the phase rotation of the measuring phasor to the phase rotation of the reference phasor, and launching protection if the comparison of the of the measuring phasor and the reference phasor fulfils a predetermined criterion.

An exemplary embodiment of the present disclosure provides a non-transitory computer-readable recording medium having a computer program recorded thereon that, when executed by a processor of a computer processing device, causes the processor to carry out a method of protecting an electric network. The exemplary method includes measuring an electric signal in the network, converting the measured signal to a frequency domain representation of the measured signal, and rotating a measuring phasor based on the frequency domain representation, where the phase rotation of the measuring phasor is dependent on at least one frequency component present in the measured electric signal. The exemplary method also includes generating a rotating reference phasor, where the reference phasor is rotated one of at a nominal frequency and a measured frequency of the electric network. In addition, the exemplary method includes comparing the phase rotation of the measuring phasor to the phase rotation of the reference phasor, and launching protection if the comparison of the of the measuring phasor and the reference phasor fulfils a predetermined criterion.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a protection relay and a method which alleviate the above-described disadvantages with known techniques.

Figure 4:
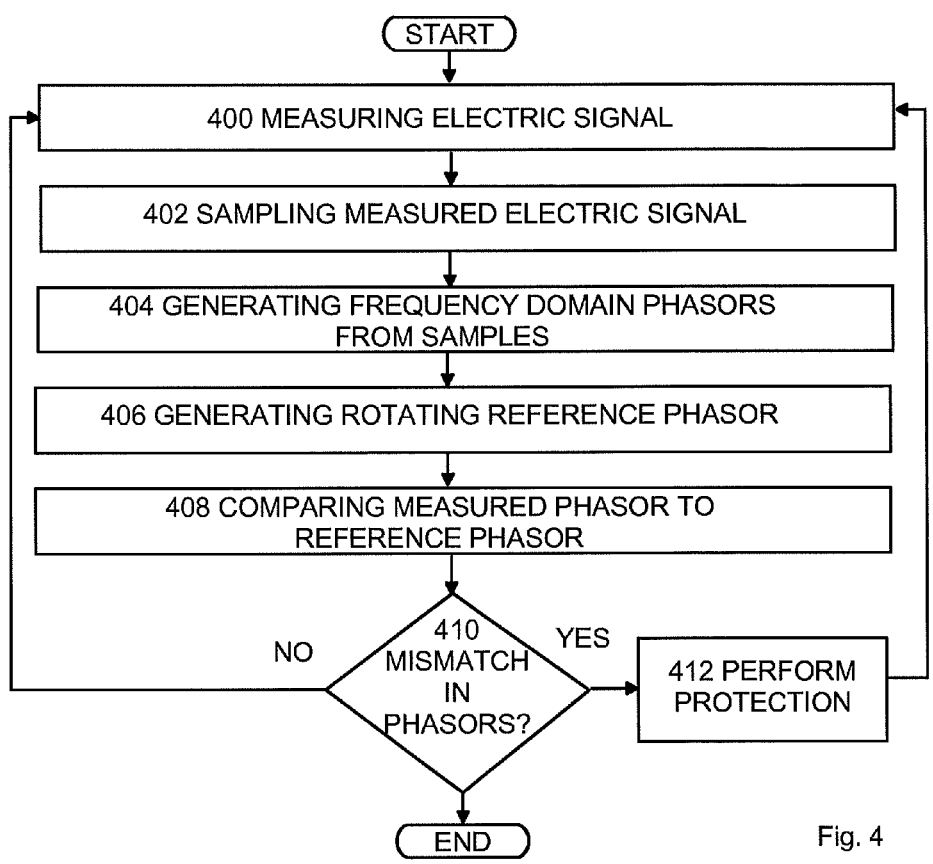
FIG. 4 shows an exemplary embodiment of a method according to the present disclosure.

FIG. 4 shows an exemplary embodiment of the method according to the present disclosure. The method is applied in an electric network including a supplying network, and a distributed generator network connected to the supplying network. The supplying network refers here thus to the main feeder network, and the distributed generator network refers to a sub-network that can provide additional power to the main network. The embodiments relate to the situation when the main network is disconnected for some reason, and network protection functionality is built such that the distributed generator network is disconnected likewise in a fault situation of the main network.

In step 400 of the protection functionality method, the voltage signal of the main network is measured. The physical location of the protection functionality is such that the functionality can measure the voltage of the main network, and control the power feeding of the sub network. The functionality can thus be part of the distributed generator network functionality, or can be separate to it, but it is operatively coupled to the distributed generator network.

In step 402, the electric signal is sampled to a continuous queue of samples. The sampling interval can be 32 samples per frequency cycle, for instance, without limiting the embodiments to that exemplary number of samples. The nominal frequency cycle refers here to a time period, when the voltage wave performs a full phase rotation in frequency domain, that is, a 50 Hz signal performs 50 frequency cycles per second, or one cycle per 20 ms.

A real valued time domain signal corresponds to a complex valued phasor in a frequency domain. In step 404, this phasor vector is continuously generated from the sample queue. Time to frequency conversion may be formed by applying discrete Fourier transform (DFT). For practical reasons, the DFT may be implemented as FFT. By using FFT calculation for sampled values, it is possible to create continuous complex vector values for every sample. The transform may be performed in a moving window having 16 previous samples, for instance. This refers to half-cycle DFT for nominal frequency. Alternatively, some other length DFT or frequency-adaptive DFT or another time to frequency domain conversion (e.g. wavelet transform) can be used for complex vector/phasor calculation. Moving the time domain signal to frequency domain corresponds to filtering of the signal, thereby effectively removing desired the signal harmonics content present in the time-domain signal.

In step 406, a rotating reference vector/phasor is generated based either on the network nominal or measured frequency. In another embodiment, the reference values are stored beforehand in the memory of the relay and are read therefrom during execution to be used in comparison. When the frequency is nominal, 50 Hz, for example, the reference phasor can be illustrated as a vector rotating with a constant speed 50 times around a unit circle in one second. The reference phasor is thus rotated continuously and simultaneously in tact with the measuring phasor at the calculation intervals, that is, substantially at the cycle or sample intervals. If the reference phasor is adaptive to the actual network signal, the adaptation interval is preferably longer than the rotation interval of the measuring phasor. If, for instance, the measuring phasor is rotated every task time, the feedback connected reference phasor rotation speed is updated more rarely. By way of an example, the updating interval may be one second, or one minute, for instance, mainly depending on the frequency measurement algorithm stabilization.

Adaptation of the reference phasor to the measured network frequency allows yet another possibility to avoid phase rotation inaccuracy. The adaptation interval may be selected according to the implementation. In an embodiment, the network frequency is measured per each sample interval, and the reference phasor is adjusted accordingly.

In step 408, one or more phasors representing signal harmonics are picked from the frequency domain representation, which has a fundamental component (having the highest amplitude, for example) and one or more harmonic components around the fundamental component. In an exemplary embodiment, only the fundamental phasor is taken into account for phase comparison of the measuring phasor and the reference phasor.

In step 410, it is checked if there is mismatch between the two phasors' rotation. A predetermined criterion may be set to check the magnitude of the mismatch. The criterion may be, for instance, that there is a 10 degree's phase difference between the two. If the phase difference is greater than 10 degrees, protection measure may be started.

The protection measures may vary according to the implementation. To mention an exemplary embodiment, the protection may be implemented in step 412 such that if the 10 degrees difference maintains for three successive measurements (samples), only then the triggering/tripping condition is considered to have occurred. To apply common relay terminology to the situation, the first 10 degree exceeding in the phase difference starts the protection functionality, and the third successive exceeding causes the relay to operate. A reset of the relay may occur after the first exceeding, if the two successive comparisons indicated no or minor phase difference.

A hysteresis limit for phase difference can also be implemented. If, for instance, the difference has been over 10 degrees for two successive measurements, it is required that the angle difference needs to be less than 8 degrees such that the tripping/operate does not occur after the third sample thereafter.

In another reset embodiment, when the starting of the relay has occurred, fault removal of the network can be observed. In fault removal observation, after the phase shift indication, one or more of the harmonic components can be taken into account. As an example, if the fundamental frequency is 50 Hz, the amplitude of the third harmonic at 150 Hz can be compared to a threshold value. It is assumed that when the fault occurs in the network, there is a strong third harmonic component also present in the signal. However, when the fault in the network disappears, the third harmonic substantially also disappears from the measured signal.

The use of the third harmonic is advantageous in a fault situation, because by this way the effect of a possibly existing direct current component, typically in a form of decaying dc, in the signal can be reduced. The frequency of the direct current component is 0 Hz and it has more effect on the neighbouring 50 Hz component than to the successive 100 Hz or 150 Hz components, for instance.

Other examples of detection of the fault removal are some other harmonics phasor, such as second harmonics, negative phase sequence voltage/current or residual voltage/current.

In the above embodiment, it is discussed of only one signal component in the electric signal. However, as the system signal in practise is a three-phase signal, similar considerations may be performed for each phase component.

The following drawings show the intermediate results of the steps in more detail.

Figure 1:
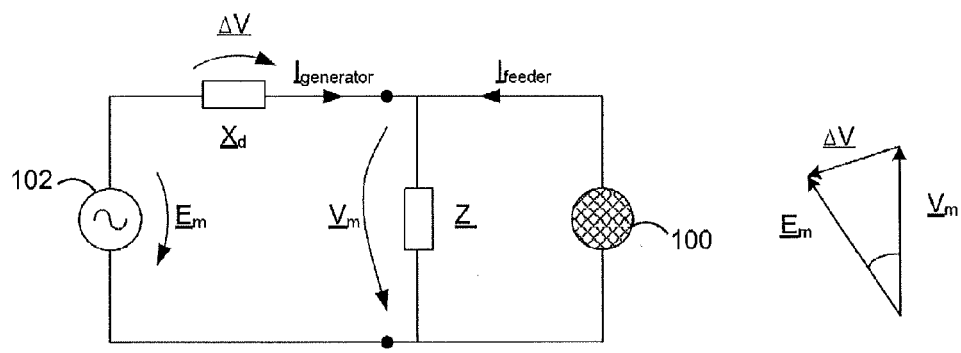
FIG. 1 shows a known normal situation in a network involving a supplying network and a distributed generator.
Figure 2:
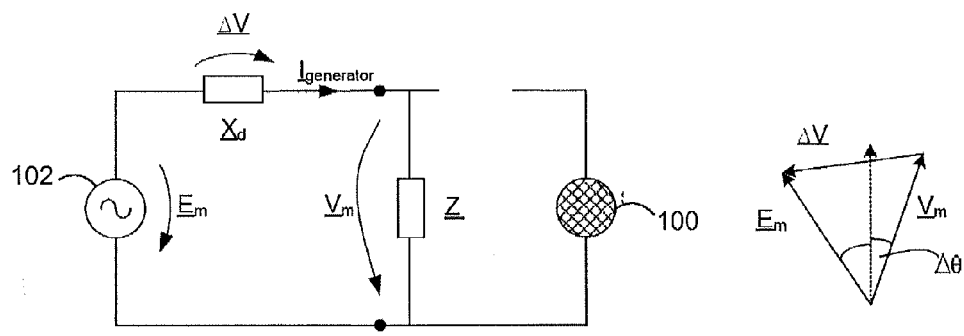
FIG. 2 shows a known fault situation in a network involving a supplying network and a distributed generator.
Figure 3:
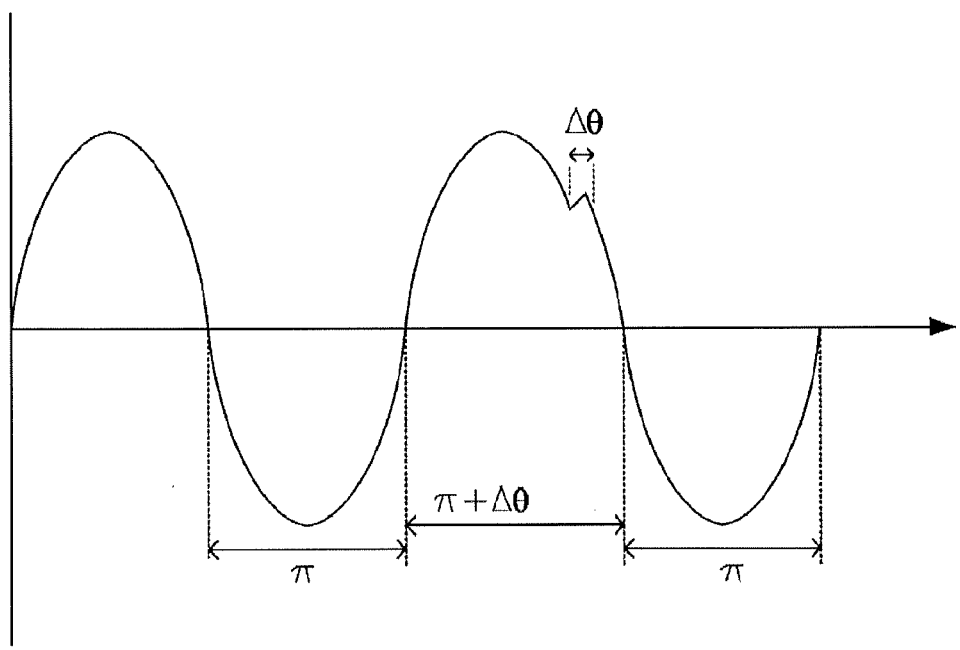
FIG. 3 shows a known way of detecting the fault situation from a signal measured at the distributed generator.

Referring to step 402, an example of the time domain (time vs. voltage) signal with a sudden phase shift occurring is shown in FIG. 3.

Figure 5:
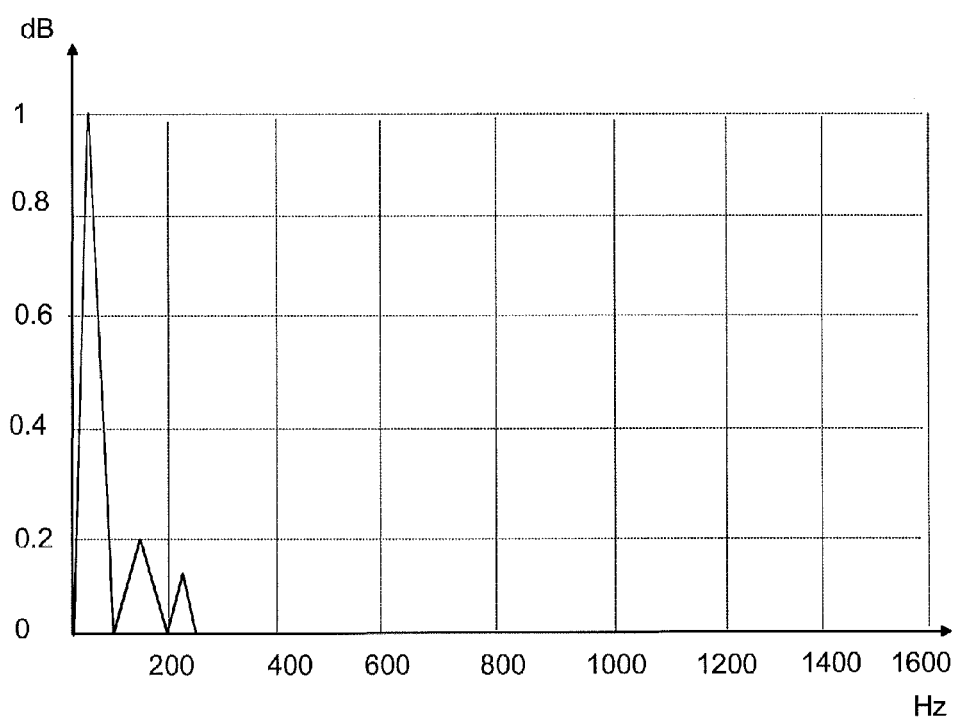
FIG. 5 shows an example of a frequency domain signal according to an exemplary embodiment of the present disclosure.

Referring to step 404, an example of a frequency domain signal is shown in FIG. 5, which shows a 32 point DFT with a 50 Hz base frequency and 1600 Hz sampling rate. It can be seen that there are three main components present in the signal, the 50 Hz fundamental frequency and the $3^{rd}$ and $5^{th}$ harmonic components at 150 and 250 Hz, respectively.

Figure 6:
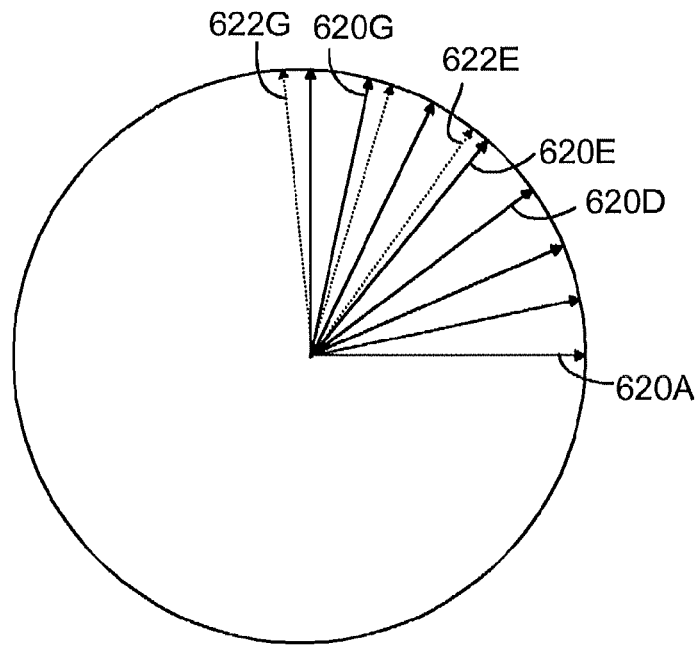
FIG. 6 shows an embodiment of a vector/phasor comparison according to an exemplary embodiment of the present disclosure.

FIG. 6 relates to step 408 in FIG. 4, that is, comparison of the measured phasor to a reference phasor. The eight first reference phasors are shown in FIG. 6, where the mutual rotation between successive solid drawn phasors has a 360°/32=11.25° phase shift. If the network frequency is measured and would be detected to be 50.5 Hz, the reference phasors adapted to that frequency would be the same but the rotation speed of the phasor would be adjusted to 50.5 cycle rotations per second.

In FIG. 6, the different positions of the reference phasor are depicted by solid arrows 620A (first vector taken as reference start vector), 620D (fourth vector), 620E (fifth vector) and 620G (seventh vector). It is assumed here that the sampling interval is 32 samples per cycle referring to 1600 Hz for 50 Hz nominal frequency or 1920 Hz for 60 Hz nominal frequency. The measuring phasor is depicted by successive dashed drawn phasors resulted from time to frequency conversion.

It is noted that the effect of the amplitude of the measured signal is neglected in FIG. 6. The amplitude of the signal would affect the length of the dashed line but the amplitude is not important in the present analysis, only the phase shift is analyzed. The criterion regarding amplitude is mainly that the amplitude has to exceed a minimum limit in order to guarantee reliable a phase value calculation.

In the first four sampling intervals in FIG. 6, the measured phasor and the reference phasor signal coincide. The measuring phasor and reference phasor rotate synchronously as long as no phase shift can be seen. In FIG. 6, the phasors rotate synchronously until phase 620E, where the phasors separate from each other. It has to be noted that only ideally both phasors represent the same absolute phase value but with some starting phase it is always possible to move phasors to coincide in unit circle.

Furthermore, if nominal frequency is used for reference phasor creation but the actual network frequency differs from nominal, there is a constantly increasing phase shift between phasors and that is to be taken into account in vector shift indication. That is, ideally the measured signal is overlapping with the reference signal 620A and the situation is the same in the next three reference intervals.

However, the measuring phasor 622E deviates from the reference phasor 620E. This deviation corresponds to the phase shift as shown in FIG. 3 where the starting vector phase has been 90° for the given sine signal. A corresponding cosine signal starting phase would have been 0°. The deviation is only about 4 degrees (and, thus it is slightly exaggerated in FIG. 3). In the sixth measuring interval, there is already about 8 degrees deviation between the measured phasor and the reference phasor (the phasors are not numbered in the Figure). In the next interval, the difference between the reference phasor 620G and the respective measuring phasor 622G is already about 15 degrees.

If phase change derivative is used as a vector shift indication, it is noticed that the derivative between the fifth and sixth interval is 4 degrees (8 degrees minus 4 degrees) and between the sixth and seventh interval is 7 degrees (15 degrees minus 8 degrees).

If we assume that a starting/tripping condition would be that the absolute deviation may not exceed 10 degrees, the measurement 622G would start a protection relay and depending on the operating criteria, if the fault does not disappear before the set operate time is exceeded, the protection relay will operate (trip) after that time fulfillment and stop feeding of power from the distributed generator to a feeder network.

There are various alternatives how the starting condition may be constructed. In another embodiment, the starting condition may be based on the derivative of the successive phases, that is, the derivative may not exceed 5 degrees, for instance. The seventh interval would thus cause starting, because the derivative value 7 exceeds the threshold setting 5 degrees. In still another embodiment, the actual tripping condition is based on an operation counter. The operation counter may be such that the derivative may not exceed the set limit during three successive measuring (sampling) intervals if operate time has been set to three sampling intervals. The operation counter would thus be started in the seventh interval in FIG. 6, and if the derivative would exceed the set limit 5 degrees in two following measurements, the tripping would occur only then. Like already stated, after the function start there can also be variety of tripping conditions available for tripping.

The quick indication of phase shift provided by the present disclosure gives time to react to the found phase shift. Immediate operation without any other checking might be risky, and thus additional checking may be done during operate time or reset period.

Even though the embodiments show a task cycle phasors, the phasors can alternatively be updated at sample intervals, or by each other sample, for instance. In any case, the rotation is performed such that the phasor gets a plurality of values during one cycle.

Figure 7:
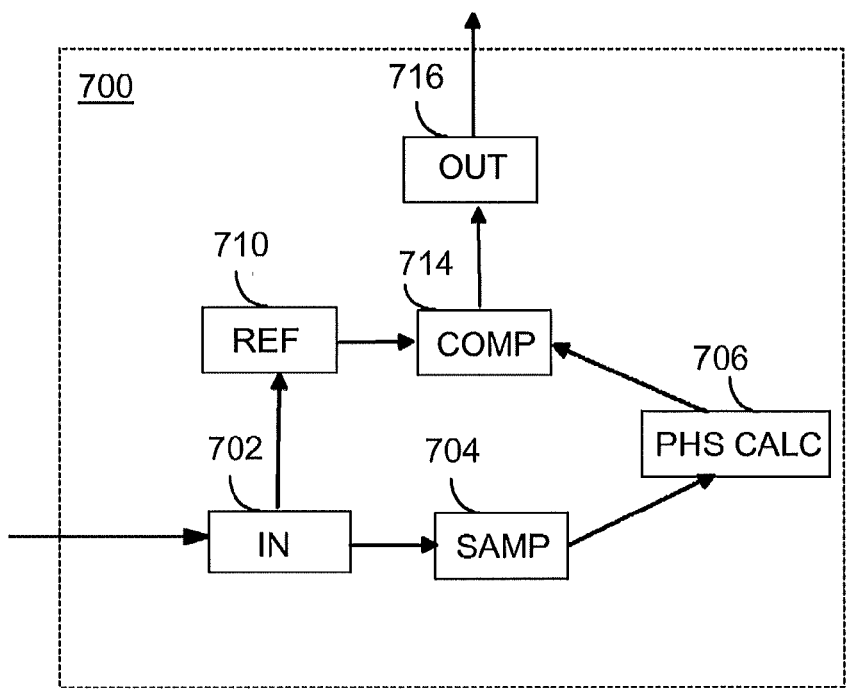
FIG. 7 shows an exemplary embodiment of an apparatus according to the present disclosure.

FIG. 7 shows an exemplary embodiment of an apparatus according to the present disclosure. The apparatus may be an intelligent electronic device (IED), such as a protection relay 700, for example.

The protection relay has an input unit 702, which takes the voltage/current of the distributed generator as an input. The measuring may be carried out to each three phases of the input signal, and fault occurrence detection may trigger the protection functionality. The relay also includes a sampling unit 704, which samples the input signal. The sampling interval may be 32 samples per a frequency cycle or some other suitable sampling interval.

The relay further includes a phasor calculation unit 706, which converts the sampled time domain signal to a rotating frequency domain phasor. The frequency domain conversion may be performed with DFT, for instance.

The relay also includes a reference signal generator 710 that may generate the rotating reference signal by using the principal frequency of the network, such as 60 Hz. Generation of the reference signal encompasses here both calculation of the reference signal, and reading of a predetermined phase values of the reference signal from a memory of the device.

Alternatively, the reference signal generator may be feedback-coupled to the sampling module 704 or the calculation module 706, depending on the frequency measurement algorithm used in relay, and measure the frequency of the distributed generator network signal, and adjust the rotating speed of the reference phasor accordingly. The adjustment interval may be selected according to the implementation. The interval may be for each sample or more rarely.

The relay also includes a comparator 714 for comparing the simultaneously rotating reference phasor formed in unit 710, and the measured phasor determined in the calculation unit 706. Visually, the calculation may be illustrated by a vector/phasor comparison in a unit circle as shown in FIG. 6. Practically, the calculation may be numeric.

The comparator may perform comparisons based on one or more comparison criteria and decide whether a starting condition of the relay occurs. The criteria may include an absolute deviation between the two vectors and/or a derivative of a deviation between the two vectors between successive samples, for instance. The comparisons may be based on a threshold criterion formed for the criterion. Furthermore, timers may be applied to ensure that the criteria are fulfilled, that is, it may be required that a deviation occurs over a predetermined time, for instance.

A hysteresis handling may be implemented. The hysteresis handling introduces a margin below the threshold. If the threshold value for the angle/phase difference would be 10 degrees, the hysteresis level could be set to 8 degrees, for instance. Normally, when a phase value would be below the threshold 10, the operate control might be reset. However, with hysteresis handling, a value 9 degrees would not reset the control, but the control would take a next sample and see which way the control may take, that is to proceed towards tripping or towards reset.

The relay also includes an output unit 716, which provides an output signal when needed. Typically there is a protection start output. Furthermore, when the operate condition of the protection relay is fulfilled, the trip/operate output signal results to the distributed generator network shut off from the feeder network.

The relay may also include fault removal detection functionality. The purpose of this functionality is to detect whether the fault in the network has disappeared and whether the starting (pick up) may be reset and the feeding from the sub-network to the main network continued/restarted. The fault removal functionality may use some other harmonic component of the frequency domain representation, such as the second or third harmonic. If those components vanish or are non-existent in the frequency domain representation, the fault is considered to have disappeared.

In accordance with an exemplary embodiment, the protection relay may include a processor, which can be a general-purpose processor configured to execute a computer program tangibly recorded on a non-transitory computer-readable recording medium, for example, a ROM, hard disk drive, optical memory or flash memory. In this case, the general-purpose processor can be configured to carry out the operative functions described herein by executing the computer program recorded on the non-transitory computer-readable recording medium. In accordance with an exemplary embodiment, the processor can be an application specific processor that is specifically configured to carry out the operative functions described herein. The non-transitory computer-readable recording medium can be a memory resident in the protective relay and/or communicatively connected to the protective relay. It is to be understood that these components in the block diagram of FIG. 7 respectively correspond to various "means" components in accordance with the exemplary embodiments of the present disclosure as described herein.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A protection relay for protection of an electric network, comprising:
   means for measuring an electric signal in the network;
   means for converting the measured signal to a frequency domain representation of the measured signal;
   means for rotating a measuring phasor based on the frequency domain representation, the phase rotation of the measuring phasor being dependent on at least one frequency component present in the measured electric signal;
   means for generating a rotating reference phasor, the reference phasor being rotated at one of a nominal frequency and a measured frequency of the electric network;
   means for comparing the phase rotation of the rotating measuring phasor to the phase rotation of the generated rotating reference phasor; and
   means for launching protection if the comparison of the measuring phasor and the reference phasor fulfils a predetermined criterion.

2. A protection relay according to claim 1, wherein the predetermined criterion is a magnitude of a deviation between the measuring phasor and the reference phasor.

3. A protection relay according to claim 2, comprising:
   means for starting the protection functionality when the predetermined criterion for launching the protection is fulfilled; and
   means for tripping, when a second criterion is fulfilled.

4. A protection relay according to claim 1, wherein the predetermined criterion is a derivative of two or more comparisons of a magnitude of a deviation between the measuring phasor and the reference phasor.

5. A protection relay according to claim 4, comprising:
means for starting the protection functionality when the predetermined criterion for launching the protection is fulfilled; and
means for tripping, when a second criterion is fulfilled.

6. A protection relay according to claim 1, comprising:
means for starting the protection functionality when the predetermined criterion for launching the protection is fulfilled; and
means for tripping, when a second criterion is fulfilled.

7. A protection relay according to claim 1, wherein the measuring phasor and the reference phasor are rotated substantially at task or sample intervals.

8. A protection relay according to claim 1, comprising:
means for comparing the phase rotations of the measuring phasor and the reference phasor of at least one signal harmonic.

9. A protection relay according to claim 1, comprising:
means for sampling the measured signal continuously, and performing the conversion to the frequency domain for each sample.

10. A protection relay according to claim 1, comprising:
means for converting the measured signal to the frequency domain by using one of a Fourier transform and a wavelet transform.

11. A method of protecting an electric network, comprising:
measuring an electric signal in the network;
converting the measured signal to a frequency domain representation of the measured signal;
rotating a measuring phasor based on the frequency domain representation, the phase rotation of the measuring phasor being dependent on at least one frequency component present in the measured electric signal;
generating a rotating reference phasor, the reference phasor being rotated one of at a nominal frequency and a measured frequency of the electric network;
comparing the phase rotation of the measuring phasor to the phase rotation of the reference phasor; and
launching protection if the comparison of the of the measuring phasor and the reference phasor fulfils a predetermined criterion.

12. A method according to claim 11, wherein the predetermined criterion is a magnitude of a deviation between the measuring phasor and the reference phasor.

13. A method according to claim 12, comprising:
starting the protection functionality when the predetermined criterion for launching the protection is fulfilled; and
operating, when a second criterion is fulfilled.

14. A method according to claim 11, wherein the predetermined criterion is a derivative of two or more comparisons of a magnitude of a deviation between the measuring phasor and the reference phasor.

15. A method according to claim 14, comprising:
starting the protection functionality when the predetermined criterion for launching the protection is fulfilled; and
operating, when a second criterion is fulfilled.

16. A method according to claim 11, comprising:
starting the protection functionality when the predetermined criterion for launching the protection is fulfilled; and
operating, when a second criterion is fulfilled.

17. A method according to claim 11, comprising:
rotating the measuring phasor and the reference phasor substantially at sample or task intervals.

18. A method according to claim 11, comprising:
comparing the phase rotations of the measuring phasor and the reference phasor of at least one signal harmonic.

19. A method according to claim 11, comprising:
sampling the measured signal continuously; and
performing the conversion to the frequency domain for each sample.

20. A method according to claim 11, comprising:
converting the measured signal to the frequency domain by using one of a Fourier transform and a wavelet transform.

21. A non-transitory computer-readable recording medium having a computer program recorded thereon that, when executed by a processor of a computer processing device, causes the processor to carry out a method of protecting an electric network, the method comprising:
measuring an electric signal in the network;
converting the measured signal to a frequency domain representation of the measured signal;
rotating a measuring phasor based on the frequency domain representation, the phase rotation of the measuring phasor being dependent on at least one frequency component present in the measured electric signal;
generating a rotating reference phasor, the reference phasor being rotated one of at a nominal frequency and a measured frequency of the electric network;
comparing the phase rotation of the measuring phasor to the phase rotation of the reference phasor; and
launching protection if the comparison of the of the measuring phasor and the reference phasor fulfils a predetermined criterion.

* * * * *